United States Patent

Brehm et al.

Patent Number: 5,151,966
Date of Patent: Sep. 29, 1992

[54] OPTICAL FIBER SUITABLE FOR USE IN OPTICAL TIME DOMAIN REFLECTOMETRY AND METHOD OF MANUFACTURING IT

[75] Inventors: Claude Brehm, Montrouge; Jean-Yves Boniort, Limours; André Tardy, Egly; Jacques Com-Nougue, Paris, all of France

[73] Assignee: Alcatel Fibres Optiques, Cedex, France

[21] Appl. No.: 720,338

[22] Filed: Jun. 25, 1991

[30] Foreign Application Priority Data

Jun. 26, 1990 [FR] France .................. 90 08017

[51] Int. Cl.$^5$ .................. G02B 6/10; B23K 26/00; B05D 5/06
[52] U.S. Cl. .................. 385/128; 385/141; 385/147; 219/121.68; 219/121.69; 427/163; 427/249; 427/250
[58] Field of Search .................. 385/128, 147, 141; 356/73.1; 427/163, 166, 167, 249, 250; 219/121.6, 121.67, 121.68, 121.69; 250/227.11, 227.14, 227.16

[56] References Cited

U.S. PATENT DOCUMENTS

| | | | |
|---|---|---|---|
| 4,076,380 | 2/1978 | Di Marcello et al. | 385/124 |
| 4,289,398 | 9/1981 | Robichaud | 356/73.1 |
| 4,390,589 | 6/1983 | Geyling et al. | 385/128 |
| 4,491,463 | 1/1985 | Weinstein et al. | 65/2 |
| 4,608,273 | 8/1986 | Brambley | 385/128 |
| 4,626,652 | 12/1986 | Bjork et al. | 385/126 |
| 4,790,625 | 12/1988 | Biswas et al. | 385/128 |
| 4,989,971 | 2/1991 | McDonald | 356/73.1 |
| 5,015,859 | 5/1991 | Uejio | 250/227.14 X |
| 5,093,880 | 3/1992 | Matsuda et al. | 385/128 |

FOREIGN PATENT DOCUMENTS

| | | | |
|---|---|---|---|
| 8910904 | 11/1989 | PCT Int'l Appl. | 427/163 X |
| 2155357 | 9/1985 | United Kingdom | 427/163 X |
| 2188719 | 10/1987 | United Kingdom | 427/163 X |

*Primary Examiner*—Brian Healy
*Attorney, Agent, or Firm*—Sughrue, Mion, Zinn, Macpeak & Seas

[57] ABSTRACT

Optical fiber suitable for use in optical time domain reflectometry and method of manufacturing the fiber. The method of manufacturing the optical fiber suitable for use in optical time domain reflectometry includes, during drawing of the fiber (2), a thin continuous coating is deposited on the fiber. A part of the coating is thereafter removably ablated in the form of a helix (15) coaxial with the fiber by rotating a laser beam (17) in a plane orthogonal to the axis simultaneously with axial movement of the fiber.

8 Claims, 1 Drawing Sheet

OPTICAL FIBER SUITABLE FOR USE IN OPTICAL TIME DOMAIN REFLECTOMETRY AND METHOD OF MANUFACTURING IT

FIELD OF THE INVENTION

The present invention concerns an optical fiber suitable for use in optical time domain reflectometry and a method of manufacturing it.

BACKGROUND OF THE INVENTION

The Optical Time Domain Reflectometry (OTDR) technique is well known for characterizing a fiber longitudinally or for interrogating an array of sensors.

This technique consists in injecting into the fiber under test a light pulse with a width of a few tens of nanoseconds at a repetition frequency in the order of 1 kHz. The reflected light is recorded as a function of time; there may be two sources of reflections, either diffusion intrinsic to the vitreous material (Rayleigh backscatter) or the presence of reflective defects. This method can be used to locate and quantify heterogeneities and deformations of the guide.

The same phenomenon can be used to interrogate an array of sensitive points distributed along the fiber. Sensors of this kind can be used to measure pressure forces. They are based on determining losses induced as a result of microcurvature.

The fiber can be positioned between two grooved plates, as described in U.S. Pat. No. 4,463,254.

Another option, as employed in HERGALITE sensors manufactured by HERGA Electric Limited, is to apply periodic microcurvature to the fiber.

European patent application 0238 440 of Mar 3, 1987 proposes to integrate discontinuities into the protective coating of the fiber.

None of the above structures can be produced continuously while the fiber is being drawn.

An object of the present invention is to avoid this drawback and to propose a process that is much more economical than prior art processes.

SUMMARY OF THE INVENTION

The present invention consists in a method of manufacturing an optical fiber suitable for use in optical time domain reflectometry in which, during drawing of the fiber, a thin continuous coating is deposited on the fiber, characterized in that part of said coating is thereafter removably ablated in the form of a helix coaxial with the fiber by means of a laser beam rotating in a plane orthogonal to said axis simultaneously with movement of the fiber.

In one embodiment said coating is obtained by depositing carbon, silicon carbide and silicon nitride in the vapor phase.

In another embodiment said coating is obtained by coating the fiber with molten metal or metal alloy.

Said laser beam is obtained from a continuous laser operating at a wavelength of 1.06 microns, for example, although a laser emitting in the ultra violet band at a wavelength between 190 and 400 nanometers can equally well be used.

In a preferred embodiment, said beam rotating in a plane orthogonal to the fiber axis is obtained by disposing around said fiber a conical mirror with an aperture at its center and an inclined plane mirror with an aperture at its center, a lens receiving the laser beam rotating about an axis parallel to its optical axis.

Another object of the present invention is an optical fiber suitable for use in optical time domain reflectometry comprising a thin coating of carbon, silicon carbide, silicon nitride, a metal or a metal alloy, characterized in that said coating is interrupted in an area defining a helix coaxial with the fiber.

The thickness of the coating is between one tenth of a micron and a few microns.

The fiber is preferably provided with an additional plastics material protective sheath.

Other characteristics and advantages of the present invention will emerge from the following description of one embodiment by way of non-limiting example only.

DESCRIPTION OF THE PREFERRED EMBODIMENTS

Figure 1:
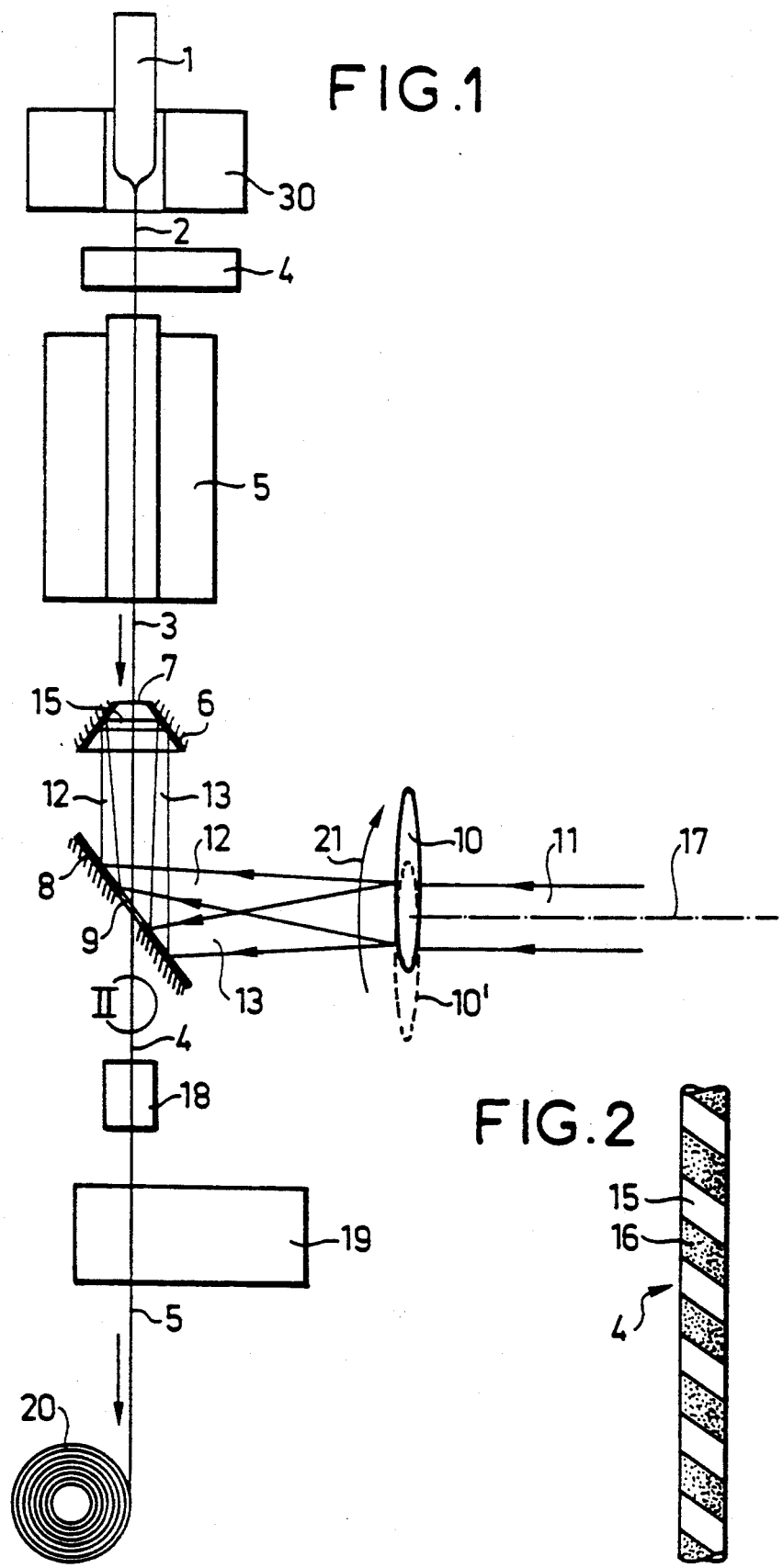
FIG. 1 is a block diagram of a fiber drawing device enabling the method in accordance with the invention to be implemented.

FIG. 1 shows a fiber drawing installation associated with a preform 1. It comprises a fiber drawing furnace 30, a device 4 for monitoring the diameter of the fiber 2 leaving the furnace 3 and a device 5 for continuously applying to the fiber 2 a metal or mineral coating by vapor phase deposition or other coating method.

For example, French patent application No 2 631 462 describes means for coating an optical fiber with a metal chosen from tin, indium, bismuth, lead, antimony, silver, aluminum and their alloys. Carbon, silicon carbide or silicon nitride can also be deposited in the vapor phase to form a coating.

The fiber 2 with its coating is denoted 3 in the figure. For a fiber with a diameter of 125 $\mu$m, the thickness of the carbon coating is between 0.1 $\mu$m and 5 $\mu$m, for example.

According to the invention, a continuous laser beam 11 operating at a wavelength of 1.06 $\mu$m and at a power in the order of 100 watts, for example, has its axis 17 orthogonal to the fiber 3. The following are placed on the path of said beam:

a convergent lens 10 which is eccentric relative to the axis 17, associated with means for rotating it about the axis 17 (as shown by the arrow 21), a plane mirror 8 inclined at 45° to the fiber and to the axis 17 with an aperture 9 at its center through which the fiber 3 passes, a conical mirror 6 coaxial with the fiber 3 with an aperture 7 at its center.

The path of the beam 11 has been shown for two positions 10 and 10' of the lens 10. When the lens is in the position 10, the beam which it transmits and which is reflected by the mirrors 8 and 6 is denoted 12. When the lens is in the position 10' the beam is denoted 13.

Figure 2:
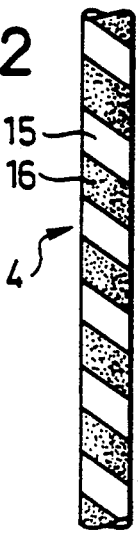
FIG. 2 is an enlarged schematic view of part of a fiber in accordance with the invention as shown at II in FIG. 1.

It can therefore be seen that the beam reflected by the mirror 6 rotates about the fiber 3 at right angles to it. Because the fiber is moving, the point of impact of the laser beam traces a helix 15 on its surface, removing the coating material. The result is the fiber 4 shown in FIG. 2 with the remaining coating 16 in contrasting helix form.

The rotation speed of the lens 10 in conjunction with the fiber drawing speed determines the pitch of the helix 15 and makes it possible to optimize microcurvature of the fiber according to its subsequent use. The fiber drawing speed is 5 meters per minute and the rotation speed of the lens 10 is 1 000 revolutions per minute, for example.

The fiber 4 then enters a device 18 for applying a plastics material coating which is polymerized in a furnace 19. The sheathed fiber 5 is formed into a coil 20 for storage; it retains adequate mechanical properties.

Of course, the invention is not limited to the embodiment just described.

A fiber in accordance with the invention in which the disconuities are integrated directly into the surface of the fiber during fiber drawing can therefore be used in known linear sensors such as pressure and temperature sensors or in wavelength-selective filters such as those described in the article by C. D. Poole and C. D. Townsend in OFC.90, TU G2 page 25. Applications of pressure sensors include intrusion detectors, security boundaries, floormats and weighing devices. Applications of temperature sensors include the detection of hot spots along a cable or at various points in a machine or installation, fire protection, etc.

We claim:

1. In a method of manufacturing an optical fiber suitable for use in optical time domain reflectometry comprising drawing of the fiber and depositing a thin continuous coating on the fiber during drawing, the improvement comprising removably ablating part of said coating to form a coating free helix coaxial with the fiber by rotating a laser beam in a plane orthogonal to said axis simultaneously with axial movement of the fiber to optimize microcurvature of the fiber according to its subsequent use.

2. Manufacturing method according to claim 1 characterized in that said coating is obtained by vapor phase deposition of carbon, silicon carbide or silicon nitride.

3. Manufacturing method according to claim 1 characterized in that said coating is obtained by application of molten metal or metal alloy.

4. Manufacturing method according to claim 1 characterized in that said laser beam is provided by a continuous laser operating at a wavelength of 1.06 microns or between 0.190 and 0.400 microns.

5. Manufacturing method according to claim 1 characterized in that said beam rotating in a plane orthogonal to the fiber axis is obtained by disposing around said fiber a conical mirror with an aperture at its center and an inclined plane mirror with an aperture at its center, a lens receiving the laser beam being adapted to rotate about an axis parallel to its optical axis.

6. Optical fiber suitable for use in optical time domain reflectometry comprising a thin coating on said optical fiber of carbon, silicon carbide, silicon nitride, a metal or a metal alloy, wherein said coating is interrupted in an area defining a coating free helix coaxial with the fiber to optimize the microcurvature of the fiber according to its subsequent use.

7. Optical fiber suitable for use in optical time domain reflectometry according to claim 6 characterized in that it is provided with an additional plastics material protective sheath.

8. Optical fiber suitable for use in optical time domain reflectometry according to claim 6 characterized in that the thickness of said coating is between one tenth of a micron and a few microns.

* * * * *